United States Patent [19]
Kojima

[11] Patent Number: 5,712,433
[45] Date of Patent: Jan. 27, 1998

[54] EXHAUST GAS MEASURING APPARATUS

[75] Inventor: Mitoku Kojima, Okazaki, Japan

[73] Assignee: Mitsubishi Jidosha Kogyo Kabushiki Kaisha, Tokyo, Japan

[21] Appl. No.: 689,494

[22] Filed: Aug. 7, 1996

[30] Foreign Application Priority Data

Aug. 7, 1995 [JP] Japan ................................. 7-200839
Jul. 9, 1996 [JP] Japan ................................. 8-179234

[51] Int. Cl.$^6$ ................................................. G01N 1/00
[52] U.S. Cl. ................................................. 73/863.03
[58] Field of Search ................... 73/23.31–23.33, 73/863.01–863.03, 863.51, 863.55, 864.34, 864.81

[56] References Cited

U.S. PATENT DOCUMENTS 5,090,258  2/1992  Yamasaki et al. ................... 73/863.03
5,138,163  8/1992  Butler et al. .
5,184,501  2/1993  Lewis et al. .
5,243,847  9/1993  Engeljehringer et al. .

FOREIGN PATENT DOCUMENTS 4116620  10/1992  Japan .

*Primary Examiner*—Robert Raevis

[57] ABSTRACT

An exhaust gas measuring apparatus includes an atmosphere introducing unit, an air purifier, a diluting unit, selecting means, a sampling unit, and measuring means. The atmosphere introducing unit takes in air in the atmosphere as diluting air. The air purifier takes in and purifies air in the atmosphere, thereby generating diluting air. The diluting unit dilutes a portion of exhaust gases of an engine with the diluting air. The selecting means causes either one of the atmosphere introducing unit and the air purifier to communicate with the diluting unit. The sampling unit collects diluted exhaust gases. The measuring means obtains the emission amount of collected exhaust gases.

13 Claims, 6 Drawing Sheets

EXHAUST GAS MEASURING APPARATUS

BACKGROUND OF THE INVENTION

1. Field of the Invention

The present invention relates to an exhaust gas measuring apparatus which obtains the emission amount of exhaust gases emitted from an engine.

2. Description of the Related Art

In an automobile, the emission amount of exhaust gases emitted from the engine is measured and evaluated in an exhaust gas test mode including acceleration and deceleration by using an exhaust gas measuring apparatus.

In the exhaust gas measuring apparatus, exhaust gases diluted with air in the atmosphere are collected by using a sampling unit, as disclosed in Jpn. UM Appln. KOKAI Publication No. 4-116620.

Most exhaust gas measuring apparatuses collect exhaust gases from the engine by using sampling units employing a method called CVS (Constant Volume Sampler).

More specifically, as shown in FIG. 5, a sampling unit a has a passage "d" interposed with a venturi b and a filter c and open to the atmosphere, a blower e for taking in air in the atmosphere into the passage d, and a passage h for introducing the exhaust gases from a test vehicle (automobile) g traveling on a chassis dynamometer f in a predetermined exhaust gas test mode into the passage d. The exhaust gases emitted from the engine are mixed in air flowing in the passage d at a predetermined flow rate with the suction force of the blower e.

The exhaust gases are collected at a portion between the passage h and the venturi b through a sampling venturi i, a passage j, and a pump (not shown), and are stored in a bag (not shown) during the test mode.

At this time, air in the atmosphere is also collected in a bag (not shown) through another passage k and a pump (not shown).

The net exhaust gas concentration is obtained with an analyzer (not shown) by subtracting regulated materials (impurities), e.g., HC, CO, and $NO_x$, contained in the collected air from the collected, diluted exhaust gases.

The net exhaust gas concentration, the flow rate coefficient of the venturi b, and the amount of diluted exhaust gases in the standard state obtained by measurement under the temperature and pressure of the inlet port of the venturi b are subjected to calculation to measure the emission amount of exhaust gases emitted from the test vehicle g.

This allows measurement of the emission amount of exhaust gases at high precision.

However, a demand has arisen for a further improvement in this precision.

This is because air pollution caused by automotive emission products is worsening each year, leading to gradual worldwide reinforcement of exhaust gas regulations. In recent years, in some areas, strict regulations have been legislated to restrict emission of harmful substances to almost zero. California State, U.S.A. legislated strict regulations which stipulate that the emission amount of harmful substances from automobiles be set to almost zero from '97 model year vehicles.

For this reason, the influence of the diluting air to the measurement supplied to the sampling unit has become an issue.

More specifically, air in the atmosphere contains many impurities that interfere with measurement of the emission amount of exhaust gases.

When air in the atmosphere is directly supplied to a sampling unit as diluting air, high measurement precision cannot be ensured because of the influence of impurities, e.g., HC, CO, and $NO_x$, in the atmosphere. As a consequence, it is impossible to measure exhaust gas with accuracy as high as required by the regulations.

As a countermeasure against this, it has been proposed to connect an air purifier n to diluting air inlet port m of a sampling unit a, as shown in FIG. 6.

More specifically, the air purifier n is constituted by a cleaner p and a blower fan q, and removes the impurities, e.g., HC, CO, and $NO_x$, in air taken in from the atmosphere with the blower fan q, with the cleaner p, thereby purifying the air.

When the purified air is supplied to the sampling unit a as a diluting air in place of air in the atmosphere, the exhaust gas measuring apparatus has high exhaust gas measuring precision.

The air purifier n is an expensive and large apparatus. Further, its running cost is high because expendables such as the filters used in the cleaner p are expensive.

The cleaner p need not be used in the case where the exhaust gas measuring can meet the test requirements or the requirements stipulated by regulations or test apparatus, without measuring the exhaust gas at a high precision.

And, the exhaust gas measuring apparatuses are provided in units of a plurality of test benches, e.g., the first and second test benches, as shown in FIG. 7, so that many tests can be performed. An automobile manufacturer usually has several to ten-odd sets of test benches.

If air purifiers n are to be provided in units of sampling units a, as described above, a rather high cost is required for this purpose.

In addition, spaces for installing the air purifiers n must be maintained in units of test benches.

SUMMARY OF THE INVENTION

One object of the present invention is to provide an exhaust gas measuring apparatus in which either purified air or the air in the atmosphere is used as purified diluting air in the CVS sampling unit, in accordance with the measurement precision required, and which can measure exhaust gas with high accuracy at low cost.

Another object of the invention is to provide an exhaust gas measuring apparatus in which purified diluted air is supplied from a small number of air purifiers to a greater number of sampling units, by using the air purifiers effectively and efficiently.

According to the present invention, there is provided an exhaust gas measuring apparatus comprising:

an atmosphere introducing unit for taking in air in the atmosphere as diluting air;

an air purifier for taking in and purifying air in the atmosphere, thereby generating diluting air;

a diluting unit for diluting a portion of exhaust gases of an engine with the diluting air;

selecting means for causing either one of the atmosphere introducing unit and the air purifier to communicate with the diluting unit;

a sampling unit for collecting diluted exhaust gases; and measuring means for obtaining an emission amount of collected exhaust gases.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

The present invention will be described by way of an embodiment shown in FIGS. 1 to 4.

Figure 1:
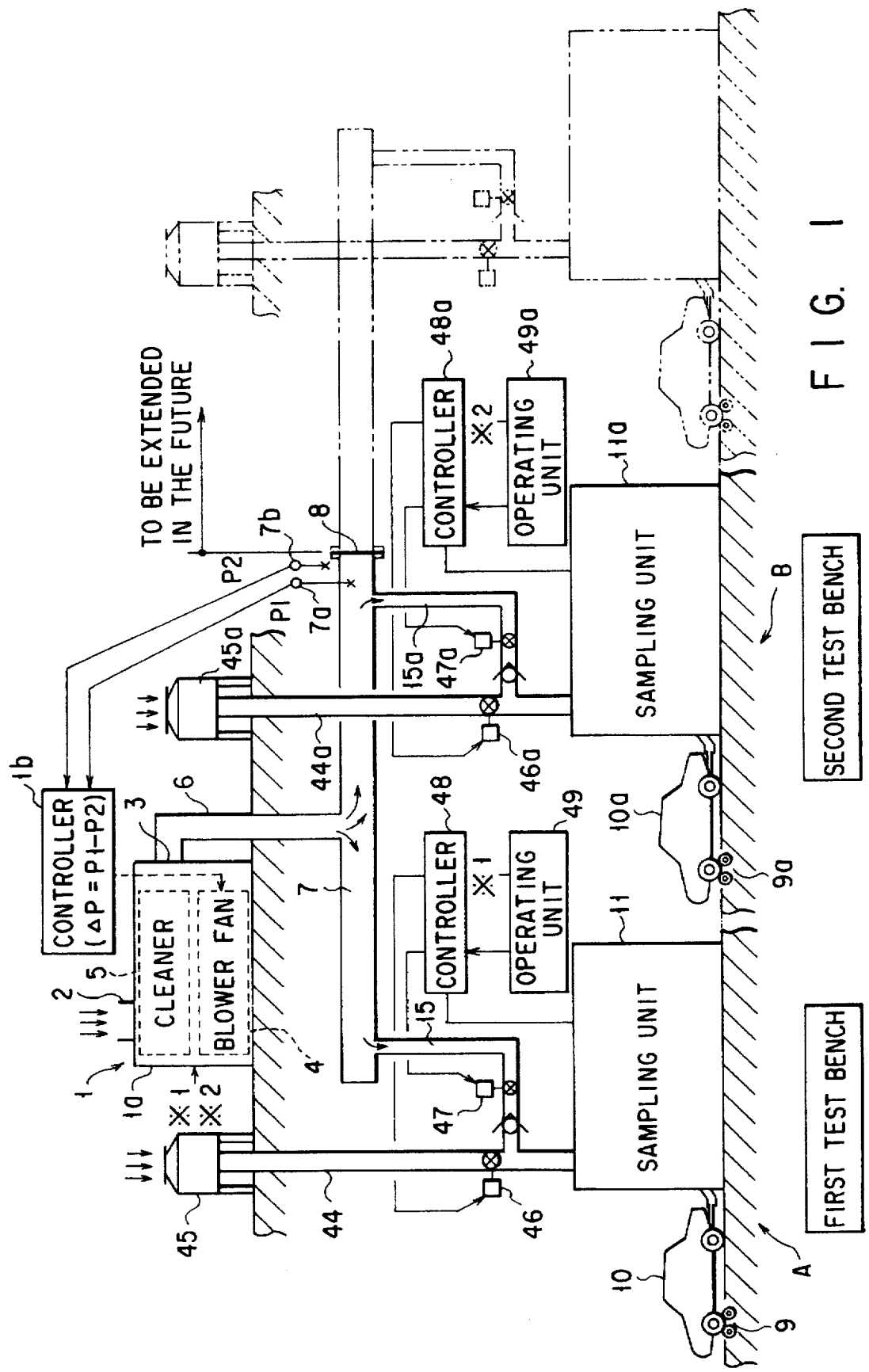
FIG. 1 is a diagram for explaining an exhaust gas measuring apparatus according to the first embodiment of the present invention.

FIG. 1 shows the overall schematic arrangement of an exhaust gas measuring apparatus to which the present invention is applied, in which reference numeral 1 denotes an air purifier installed in, e.g., the machine room of a building.

A main body 1a of the air purifier 1 has an air inlet port 2 open to the atmosphere and an air outlet port 3.

A blower fan 4 and a cleaner 5 are disposed in the main body 1a. The blower fan 4 takes in air in the atmosphere from the air inlet port 2 and supplies it to the air outlet port 3 with a variable air blowing performance. The cleaner 5 removes impurities, e.g., HC, CO, and $NO_x$, contained in the intake air.

Figure 2:
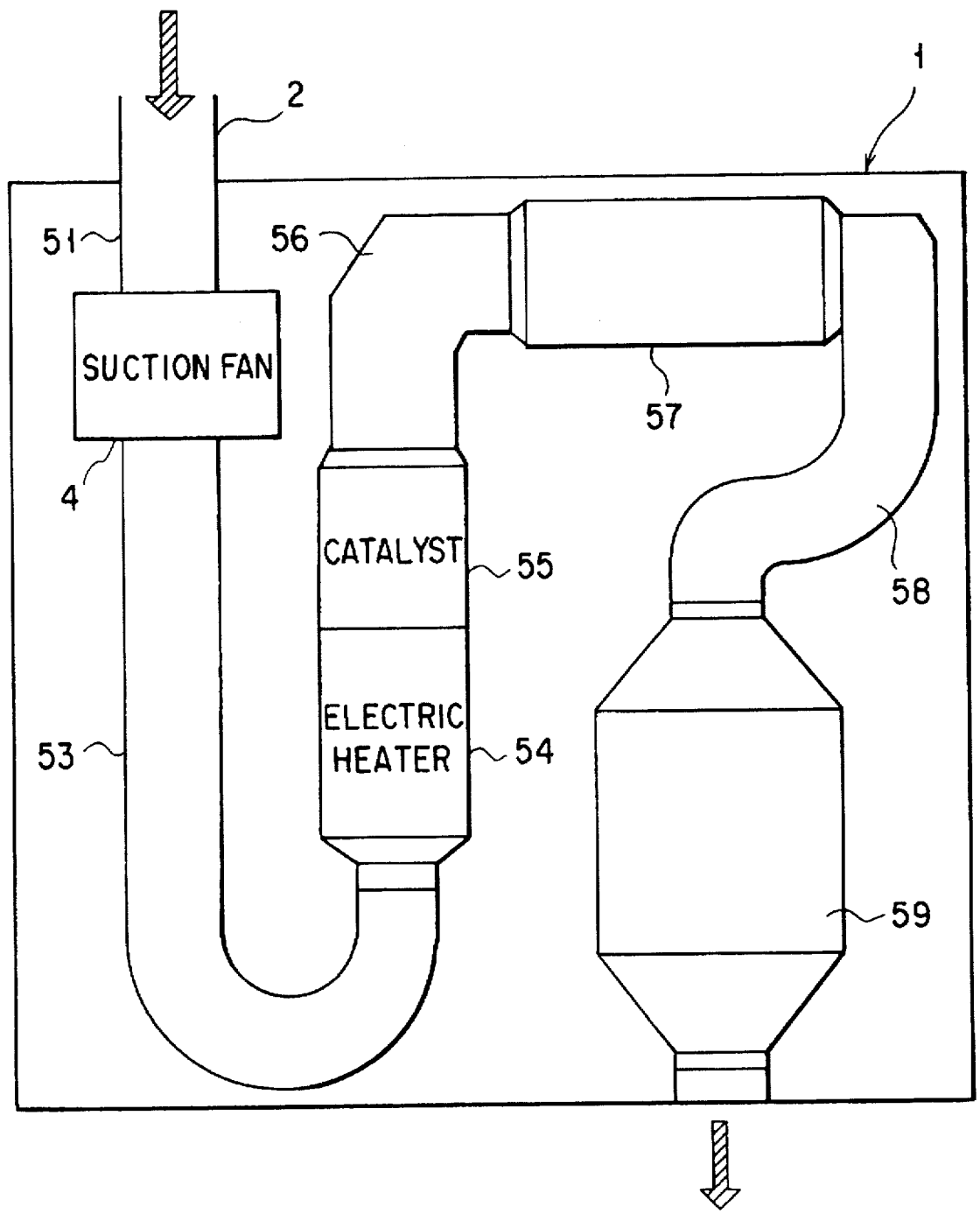
FIG. 2 is a diagram showing the arrangement of the air purifier in detail.

The arrangement of the air purifier 1 will be described in detail with reference to FIG. 2. In FIG. 2, a pipe 51 connected to an inlet port 2 is connected to a suction fan 4. Air in the atmosphere is drawn by the suction fan 4. The downstream side of the suction fan 52 is connected to an electric heater 54 and a catalyst 55 through a U-shaped pipe 53. The electric heater 54 heats the atmosphere drawn by the suction fan 52 to about 400° C.

The catalyst 55 is an oxidizing catalyst for generating $H_2O$ and $CO_2$ by complete combustion of HC and CO. Since the electric heater 54 also serves to activate the catalyst, it is placed on the upstream side of the catalyst 55.

The downstream side of the catalyst 55 is connected to a cooling unit 57 through an L-shaped pipe 56. Air is cooled by the cooling unit 57.

The downstream side of the cooling unit 57 is connected to an activated carbon adsorption layer 59 through a pipe 58. $NO_x$ is removed by the activated carbon adsorption layer 59.

The air outlet port 3 is connected to a main duct 7 (corresponding to the main passage) disposed on, e.g., the ceiling of the first floor of the building, through a connecting duct 6.

The main duct 7 is connected to sampling units 11, 11a, ... provided in units of test benches (to be described later) installed on the floor of the first floor. Air purified by the air purifier 1 is sent to the respective sampling units 11, 11a, ... through the main duct 7.

For example, one end portion of the main duct 7 is closed with a detachable blind cover 8 to allow extension of the main duct 7.

The air purifier 1 is provided with a controller 1b (comprising a microcomputer and its peripheral circuits and corresponding to a flow rate controller) for supplying purified air at an appropriate flow rate in accordance with the number of sampling units 11, 11a, ... in operation.

More specifically, the controller 1b is connected to the blower fan 4. The controller 1b is also connected to a sensor 7a for detecting a pressure $P_1$ in the main duct 7 and a sensor 7b for detecting an atmospheric pressure $P_2$.

The controller 1b has a function of controlling the rotation speed of the blower fan 4 in order to set a difference $\Delta P$ between the pressures $P_1$ and $P_2$ at a substantially constant value, so that a necessary supply gas volume can always be ensured.

With this function, a necessary amount of diluting air is automatically adjusted in accordance with the number of sampling units 11, 11a, ... in operation and supplied to the main duct 7.

A plurality of test benches, e.g., two sets of test benches A and B (the first and second test benches) are disposed on the floor surface of the first floor.

The first and second test benches A and B employ the same structure.

Figure 3:
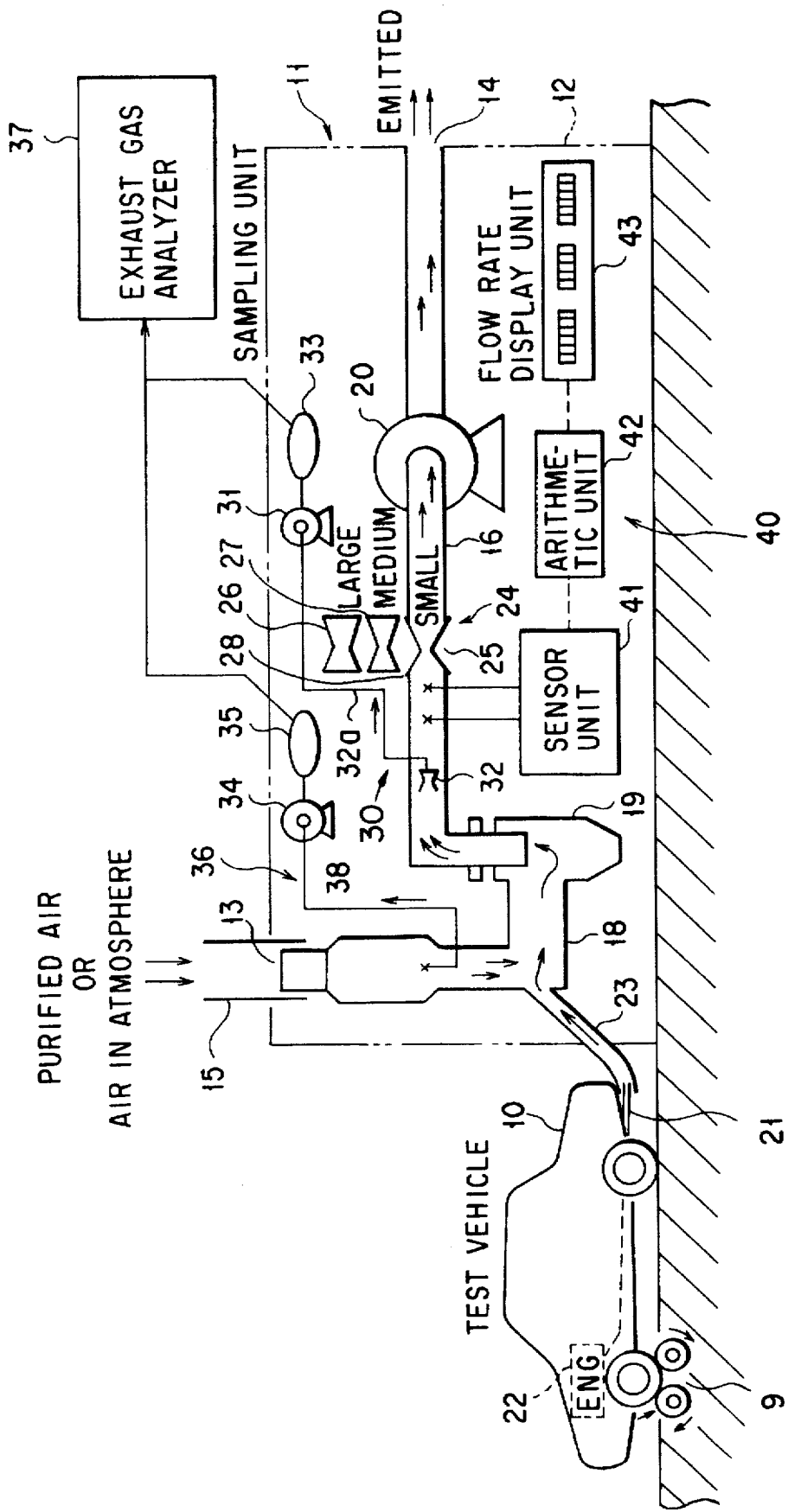
FIG. 3 is a diagram for explaining the structure around the sampling unit of the exhaust gas measuring apparatus.

FIG. 3 shows the structure around one of the test benches, e.g., the test bench A.

The structure around the test bench A will be described. Reference numeral 9 denotes a chassis dynamometer for driving a test vehicle 10 (corresponding to the automobile) while the vehicle body stands still.

The sampling unit 11 is installed near the chassis dynamometer 9.

The sampling unit 11 employs, e.g., a CVS (Constant Volume Sampler).

The sampling unit 11 will be described. A main body 12 of the sampling unit 11 has an inlet port 13 for taking in diluting air and an outlet port 14 open to the atmosphere.

The inlet port 13 is connected to a branch duct 15 (corresponding to a branch passage) branching from the main duct 7 for each sampling unit. Air purified by the air purifier 1 can be taken in as the diluting air through the inlet port 13.

A passage 16 (corresponding to the first passage portion) is provided in the main body 12 so that the inlet port 13 and the outlet port 14 communicate with each other.

A mixing unit 18, and a cyclone 19 for removing dust are disposed in the passage 16 from the upstream side in this order. A turbo blower 20 (corresponding to a suction unit) for drawing air to the downstream side is disposed on the downstream side of the passage 16. The turbo blower 20 draws diluting air from the inlet port 13.

A connecting pipe 23 (corresponding to the second passage portion) which is to be detachably connected to an exhaust pipe 21 (through which exhaust gases from an engine 22 mounted on the test vehicle 10 are emitted into the atmosphere) extends from the mixing unit 18. Thus, the exhaust gases emitted from the engine 22 are diluted by mixing with diluting air flowing through the passage 16.

A venturi unit 24 for setting an appropriate diluting rate is inserted at a passage portion between the turbo blower 20 and cyclone 19 on the downstream side of the cyclone 19.

More specifically, the venturi unit 24 has a venturi setting portion 25 arranged where the venturi unit 24 is set, and a plurality of types of venturis attachable on and detachable from the venturi setting portion 25. The plurality of types of venturis are, e.g., three types of venturis, including a large venturi 26, a medium venturi 27, and a small venturi 28 that are classified in accordance with the specific flow rate performance.

The turbo blower 20 has such a suction force that sufficiently maintains a critical flow regardless of which one of the venturis 26 to 28 is selected. When one of the venturis 26 to 28 is selected, a gas mixture (a mixture of the exhaust gases and the diluting air) flows through the passage 16 at a predetermined flow rate determined by the selected venturi.

In other words, the necessary supply amount of diluting air is adjusted by setting a venturi selected from the large, medium, and small venturis 26 to 28 to the venturi setting portion 25.

Hence, an appropriate diluting rate is selected by properly using the three types of venturis 26 to 28 in accordance with the exhaust gas test mode and the size (test conditions) of the engine 22.

A measuring system 40 for measuring the amount of diluted exhaust gases is provided on the upstream side of the venturi setting portion 25 which is maintained at a predetermined flow rate.

The measuring system 40 is constituted by, e.g., a sensor unit 41, an arithmetic unit 42, and a flow rate display unit 43. The sensor unit 41 measures the temperature and pressure at the inlet port of the venturi. The arithmetic unit 42 calculates the amount of diluted exhaust gases in the standard state based on the information on the temperature and pressure, the flow rate coefficient of the venturi, and the time. The flow rate display unit 43 displays the calculation result.

Hence, a diluted exhaust gas amount necessary for obtaining the emission amount of exhaust gases can be obtained.

Furthermore, a collecting unit 30 is provided on the upstream side of the venturi setting portion 25.

In the collecting unit 30, diluted exhaust gases (a gas mixture of the exhaust gases and diluting air) are collected from a sampling venturi 32 disposed on the upstream side of the venturi setting portion 25 at a predetermined flow rate with the suction force of a suction pump 31 disposed outside the passage, and is stored in a bag 33.

With this collecting structure, in the exhaust gas test mode, the diluted exhaust gases are stored in the bag 33, so that information on the average concentration of the exhaust gas in the exhaust gases test mode can be obtained.

A collecting unit 36 for the diluting air is interposed on the upstream side of the mixing unit 18. In the collecting unit 36, only the diluting air is collected with a Suction pump 34 and stored in a bag 35 through a passage 38.

With this collecting unit 36, in the exhaust gas test mode, the regulated materials (impurities), e.g., HC, CO, and $NO_x$, remaining in the purified air (diluting air) are stored.

Gases in the bags 33 and 35 are analyzed by an analyzer 37 (constituting a measuring means together with the measuring system 40), so that the net exhaust gas concentration can be obtained.

More specifically, the analyzer 37 has a function of obtaining the net exhaust gas concentration by subtracting the regulated materials (impurities), e.g., HC, CO, and $NO_x$, contained in the purified air collected in the bag 35 from the diluted exhaust gases collected in the bag 33, and a function of obtaining the emission amount of exhaust gases by calculation of the net exhaust gas concentration and the prescribed diluted exhaust gas amount in the standard state.

Hence, the emission amount of exhaust gases emitted from the test vehicle 10 is obtained.

As shown in FIG. 1, a duct 44 (corresponding to a passage for taking in air in the atmosphere) extending to the machine room is connected to the outlet port of the branch duct 15 to communicate with it.

The distal end portion of the duct 44 is connected to an atmosphere introducing unit 45 installed on, e.g., the rooftop of the building and incorporating a filter.

The duct 44 and the branch duct 15 are respectively provided with valve units, e.g., motor-driven first and second valves 46 and 47 (switching valve units; corresponding to valve units) for opening/closing the ducts 44 and 15.

The purified air from the air purifier 1 or air in the atmosphere is selectively supplied to the sampling unit 11 as diluting air through the first and second valves 46 and 47, or purified air is supplied to the sampling unit 11 at a flow rate corresponding to the diluting rate.

More specifically, the first and second valves 46 and 47 are connected to a controller 48 (comprising, e.g., a microcomputer and its peripheral equipment) provided to each sampling unit 11.

An operating unit 49 provided to each controller 48 has various types of operation button portions, e.g., a power button portion for turning on/off the sampling unit 11, a button portion for setting an exhaust gas test mode which uses air in the atmosphere as the diluting air, a button portion for setting an exhaust gas test mode which uses purified air as the diluting air, and a venturi selection button portion (not shown) for inputting which venturi is used.

The controller 48 has the following functions:

The function of stopping the operation of the sampling unit 11 and driving the first and second valves 46 and 47 to fully close them when the power button portion is turned off.

The function of driving the first and second valves 46 and 47 to fully open and fully close, respectively, when the button portion of an exhaust gas test mode which uses air in the atmosphere as the diluting air is turned on.

The function of driving the first valve 46 to fully close and the second valve 47 to fully open, semi-open, or slightly open it in accordance with which one of the large, medium, and small venturis 26 to 28 is selected by the venturi selection button portion when the button portion of an exhaust gas test mode which uses purified air as the diluting air is turned on.

The function of operating the sampling unit 11 in accordance with the exhaust gas test mode when the power button portion is turned on.

With these functions, only by operating the operating unit 49, purified air from the air purifier 1 or air in the atmosphere is used as the diluting air, or purified air at a predetermined flow rate corresponding to the selected one of the large, medium, and small venturis 26 to 28 is taken in from the air purifier 1.

The second test bench B also employs this structure. Necessary purified air can be supplied to a plurality of sampling units, e.g., two sampling units 11 and 11a in this case, with one air purifier 1, which is a necessary minimum number.

Regarding information output upon operation of the operation buttons of the operating unit 49, a signal output from the operation unit (not shown) of the sampling unit 11 or from an automatic measuring apparatus (not shown), which is of the same type as that output from the operating unit 49, may be directly connected to the controller 48.

The air purifier 1 can purify and blow a maximum diluting air amount necessary for the plurality of sampling units.

Referring to FIG. 1, suffix "a" is added to the reference numeral of each component around the second test bench B, so that the first and second test benches A and B can be discriminated from each other.

The operation of the exhaust gas measuring apparatus having the above arrangement will be described.

In this case, assume that the emission amount of exhaust gases of each of the test vehicles 10 and 10a in the exhaust gas test mode is to be measured by using both of the first and second test benches A and B and using purified air as the diluting air.

As a preparation for this, for example, in the first test bench A, the connecting pipe 23 is connected to the exhaust pipe 21 of the test vehicle 10 placed on the chassis dynamometer 9. An appropriate venturi, e.g., the small venturi 28, is selected from the three venturis 26 to 28 in accordance with the exhaust gas test mode and the size (test conditions) of the engine 22 of the test vehicle 10, and is set in the venturi unit 24, so that an appropriate diluting ratio (the ratio of exhaust gas amount emitted from the test vehicle 10 to the amount of diluting air) is obtained. In this selection, a consideration is made so that the water content in the exhaust gases will not be condensed and the measuring precision will not become low (the exhaust gas measurement concentration will not become excessively low).

When the small venturi 28 is set, the necessary supply amount of diluting air for the sampling unit 11 is determined.

Similarly, in the second test bench B, a connecting pipe 23a is connected to an exhaust pipe 21a of a test vehicle 10a placed on a chassis dynamometer 9a, and an appropriate venturi is selected from three venturis 26 to 28 and set in the venturi portion of the sampling unit 11a, so that an appropriate diluting ratio (the ratio of exhaust gas amount emitted from the test vehicle 10 to the amount of diluting air) is obtained.

Subsequently, the operating units 49 and 49a provided in units of test benches are operated.

This operation is done when the type of venturi selected with the venturi selection button is input, the button portion of the exhaust gas test mode which uses purified air as the diluting air is turned on, and the power button portion is turned on.

In response to this operation, the purified air draft system is set, and the air purifier 1 and the respective sampling units 11 and 11a are operated.

Figure 4:
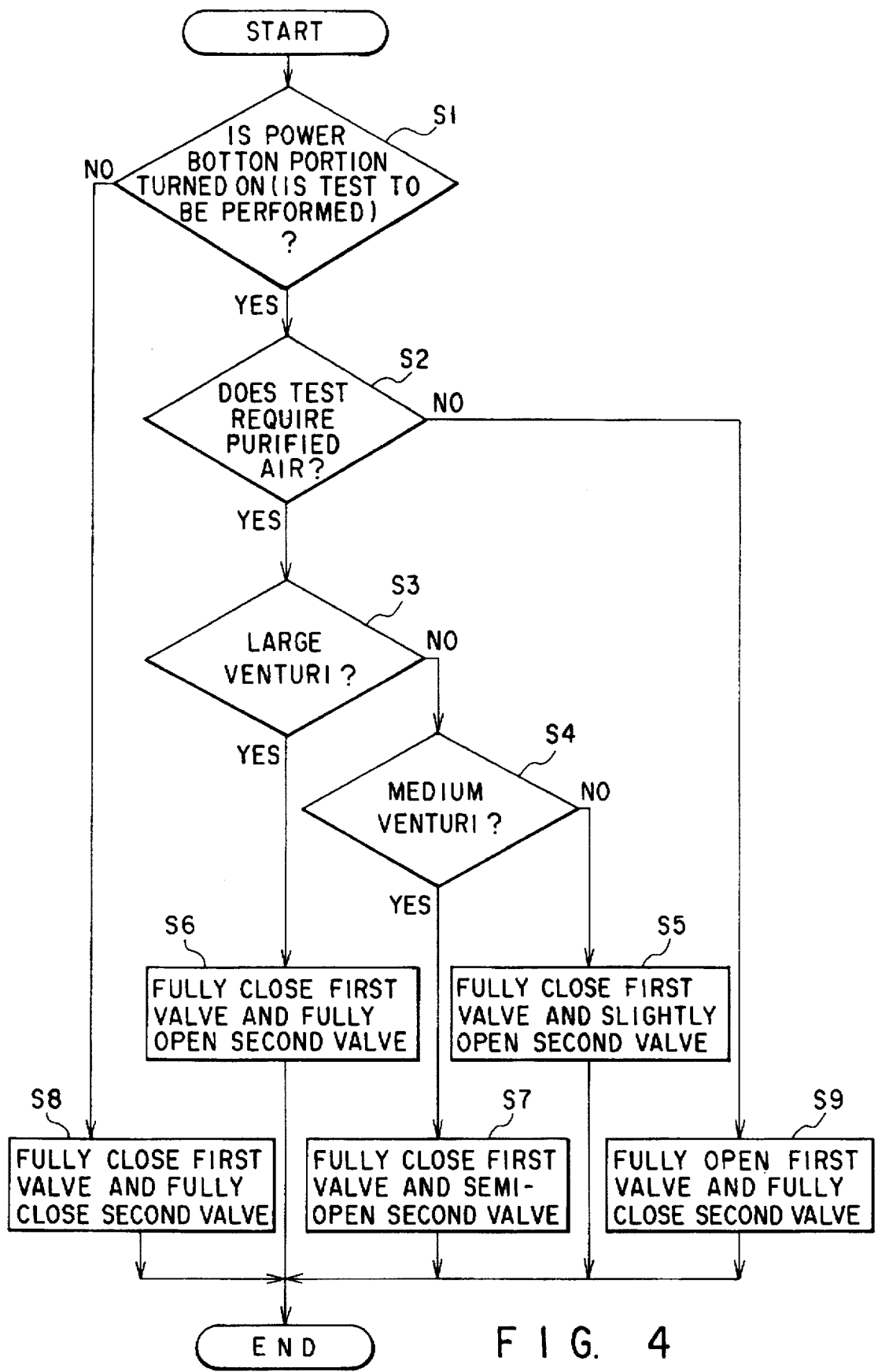
FIG. 4 is a flow chart for explaining a control operation for appropriately supplying purified diluting air supplied from an air purifier to a sampling unit in operation.
Figure 5:
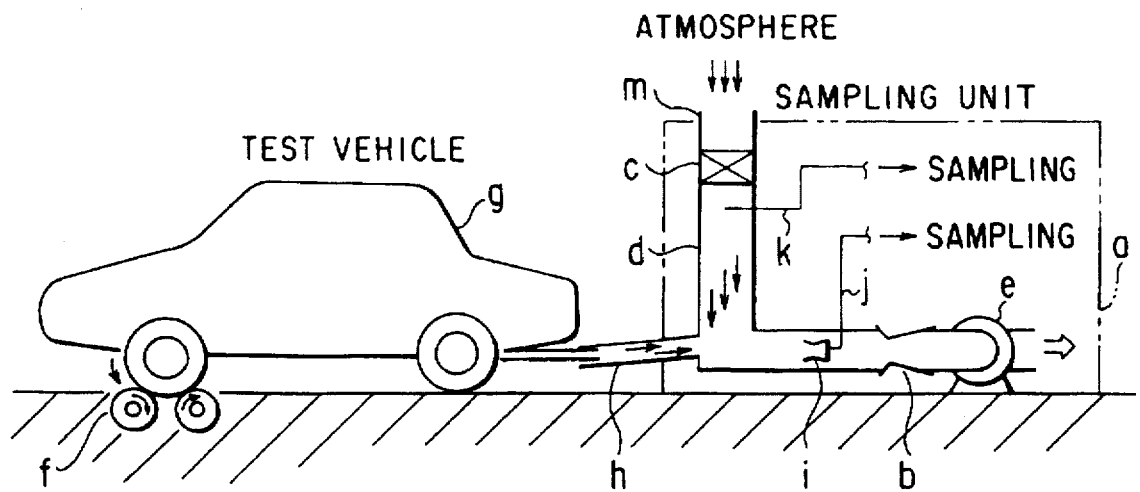
FIG. 5 is a diagram for explaining a conventional exhaust gas measuring apparatus.
Figure 6:
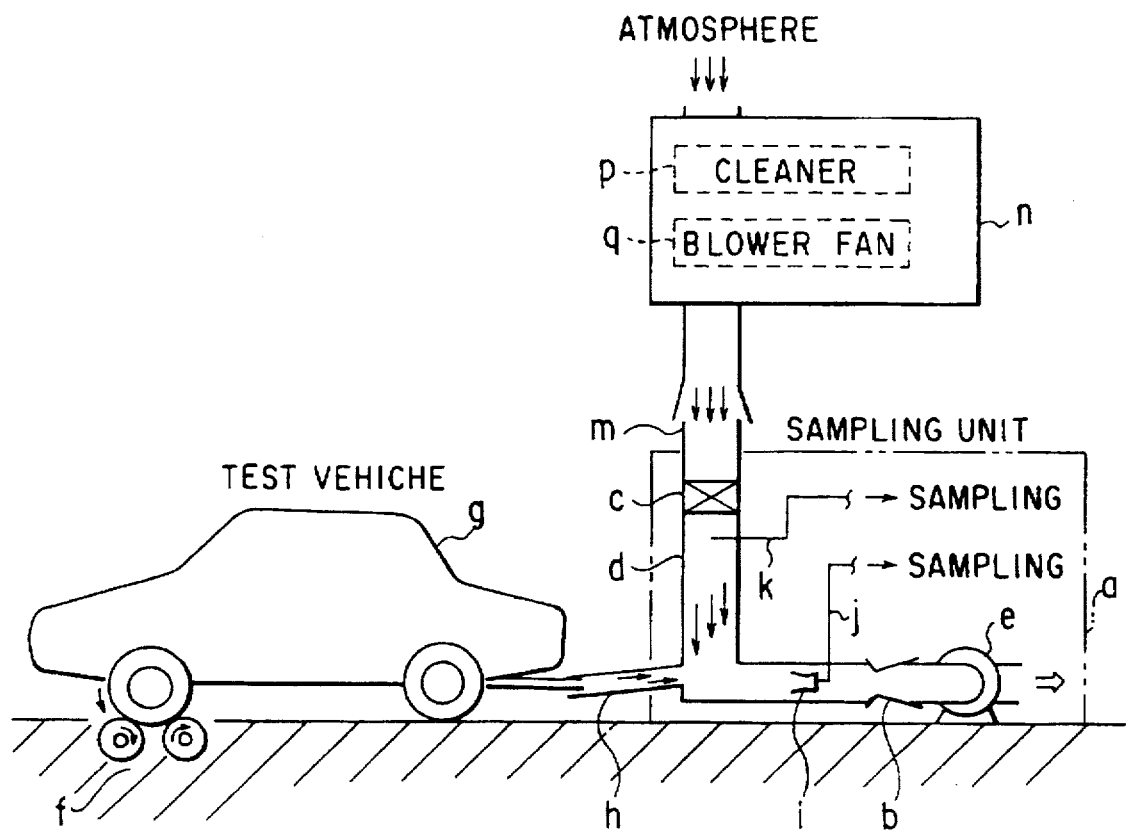
FIG. 6 is a diagram for explaining an exhaust gas measuring apparatus in which an air purifier is connected to its sampling unit to dilute exhaust gases, so that the measurement precision is improved.
Figure 7:
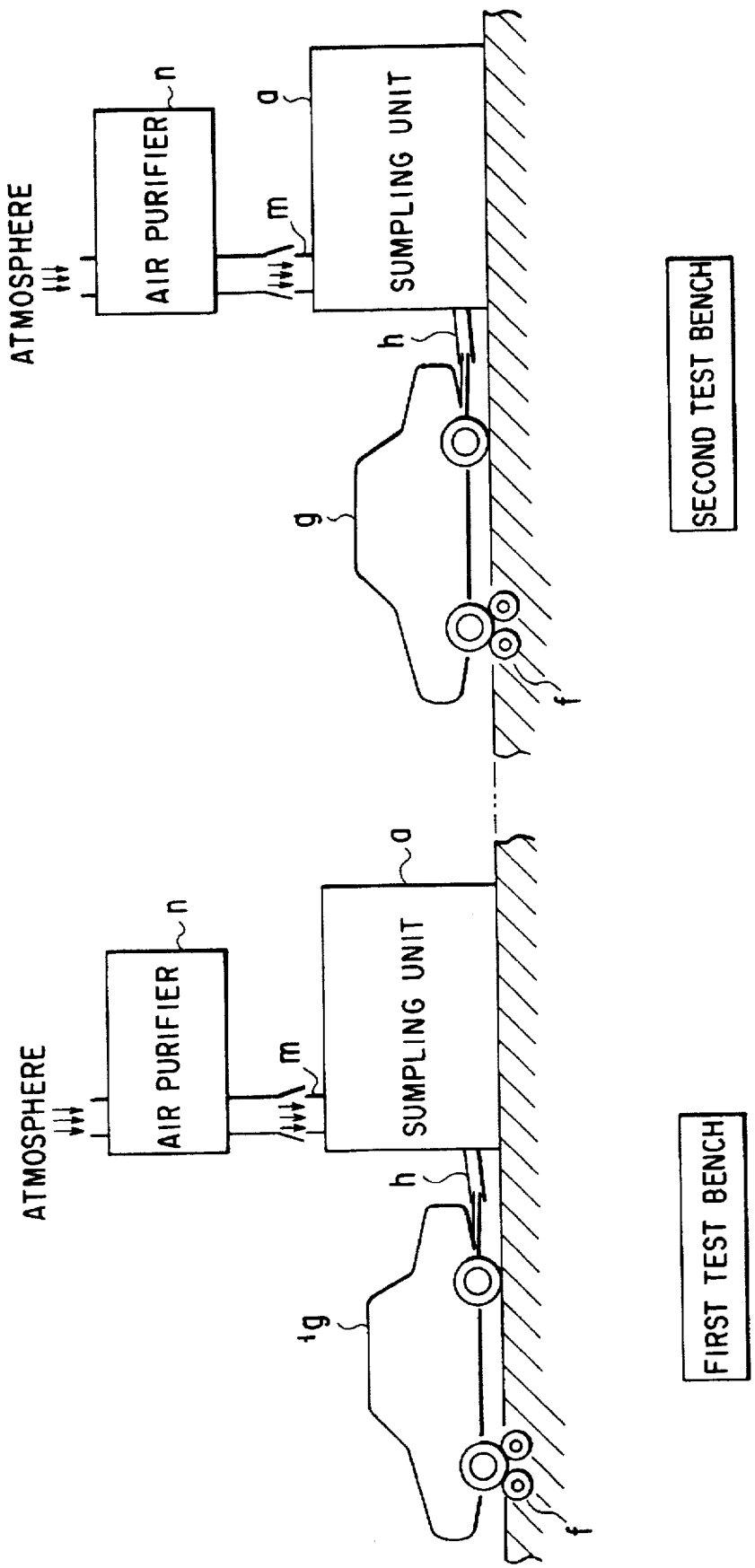
FIG. 7 is a diagram for explaining a facility in which a plurality of sampling units each having the air purifier are provided.

FIG. 4 shows the control flow chart of this purified air draft system.

How to obtain the emission amount of exhaust gases will be described by using this control flow chart. Upon reception of information input from the operating unit 49, the controller 48 of the sampling unit 11 checks whether the test is to be performed in accordance with whether the power button portion of the operating unit 49 is turned on, as shown in step S1.

Since the power button portion of the operating unit 49 is ON, the flow advances to step S2 in response to this ON signal.

In step S2, whether the test requires purified air is checked in accordance with whether the button portion of the exhaust gas test mode which uses purified air as the diluting air is turned on.

Since the button portion of the exhaust gas test mode which uses purified air as the diluting air is ON, it is determined from this ON signal that highly precise exhaust gas measurement which uses purified air is to be performed, and the flow advances to step S3.

In steps S3 and S4, which venturi is used is checked.

Since an input indicating that the small venturi 28 is set to the venturi setting portion 25 has been made in the operating unit 49, the controller 48 enters step S5 via steps S3 and S4.

In step S5, the controller 48 drives the first valve 46 to a fully closed position and the second valve 47 to a slightly opened position so that a passage for the purified air is ensured and a supply amount of diluting air corresponding to the specific flow rate of the small venturi 28 is ensured.

In this manner, the purified air draft system of the first test bench A is set.

The purified air draft system of the second test bench B is also set in the same manner under the control of a controller 48a of the sampling unit 11a.

When the sampling unit (non-operating sampling unit) is not used, i.e., is stopped, both the first and second valves 46 and 47 (46a and 47a) are fully closed by the OFF signal from the power button portion which is input through the controller 48 (48a) (step S8).

By these control operations, a preparation for supplying only necessary amounts of diluting air to the sampling units 11, 11a is done.

Thereafter, the air purifier 1 and the sampling units 11 and 11a are operated.

Upon operation of the air purifier 1, air in the atmosphere is taken in by the blower fan 4, and any impurities contained in this air are removed by the cleaner 5, thereby purifying the air. This purified air is supplied from the connecting duct 6 to the respective branch ducts 15 and 15a through the main duct 7.

In the sampling unit 11, the turbo blower 20 is activated to draw air in the passage 16 to be exhausted to the atmosphere.

Then, the flow velocity of the gas flowing through the small venturi 28 is maintained at a critical flow, and the gas in the passage 16 flows while it maintains a predetermined flow rate determined by the small venturi 28.

With the suction force generated at this time, the purified diluting air is taken in from the inlet port 13 and reaches the mixing unit 18.

At this time, on the chassis dynamometer 9 of the first test bench A, the test vehicle 10 is being driven in accordance with the exhaust gas test mode.

The exhaust gases emitted from the test vehicle 10 reach the mixing unit 18 through the connecting pipe 23, and are diluted as they are mixed with the diluting air flowing through the mixing unit 18.

When this diluted exhaust gases pass through the cyclone 19, dust in the diluted exhaust gases is removed.

The diluted exhaust gases pass through the small venturi 28 and are emitted to the atmosphere from the turbo blower 20.

The temperature and pressure of the diluted exhaust gases flowing at the predetermined flow rate are detected by the sensor unit 41 at the inlet side of the small venturi 28.

The arithmetic unit 42 performs a calculation based on the information on temperature and pressure, the flow rate coefficient of the venturi, and the time, to obtain the amount of diluted exhaust gases in the standard state. The flow rate display unit 43 displays the amount of diluted exhaust gases in this exhaust gas test mode.

Meanwhile, both the sampling suction pumps 31 and 34 are in operation.

With the suction force of the suction pump 31, the sampling venturi 32 draws the diluting air maintained at a critical flow.

The diluted exhaust gases flowing in the passage 16 are collected through the sampling venturi 32 and a collection pipe 32a, and are stored in the bag 33 at a predetermined flow rate in the exhaust gas test mode.

The diluting air before being mixed with the exhaust gases is collected by the suction force of the suction pump 34, and is stored in the bag 35 in the exhaust gas test mode in the same manner.

The analyzer 37 calculates the net exhaust gas concentration by subtracting the regulated materials (impurities), e.g., HC, CO, and $NO_x$, contained in the purified air collected in the bag 35 from the diluted exhaust gases collected in the bag 33.

The net exhaust gas concentration and the prescribed diluted exhaust gas amount in the standard state metered by the small venturi 28 are subjected to calculation by using the analyzer 37, thereby obtaining the emission amount of exhaust gases emitted from the test vehicle 10 traveling in the exhaust gas test mode.

This measurement is performed by the second test bench B as well in the same manner, thereby obtaining the emission amount of exhaust gases emitted from the test vehicle 10a.

While the sampling units 11 and 11a are operating in this manner, the controller 1b of the air purifier 1 controls the rotation speed of the blower fan 4 by detecting the pressure $P_1$ in the main duct 7 and the atmospheric pressure $P_2$ and monitoring the pressure difference Δ between them, so that necessary diluting air is supplied.

When the two sampling units 11 and 11a operate, the blower fan 4 is controlled to increase its rotation speed so that a necessary amount of diluting air is always ensured.

With this control, the exhaust gas test can be performed well in which one air purifier 1 is used and two sampling units 11 and 11a (test benches A and B) are used simultaneously.

When one of the two test benches, e.g., the test bench B, is stopped, the sampling unit 11a of the test bench B is stopped, and the first and second valves 46a and 47a are fully closed. Simultaneously, the controller 1b of the air purifier 1 decreases the rotation speed of the blower fan 4 to suppress variations in pressure-difference ΔP occurring upon closing of the branch duct 15a, thereby ensuring the diluting air amount which is necessary by only the sampling unit 11.

Hence, even when one air purifier 1 and one sampling unit 11 (test bench A) are used, the exhaust gas test can be performed well.

When an exhaust gas test is performed which does not require high precision, unlike in a case wherein purified air is used as the diluting air, and air in the atmosphere is directly used as the diluting air, the button portions of the exhaust gas test mode using air in the atmosphere as the diluting air, which are located on the operating units 49 and 49a of the test benches that are to perform this test, may be turned on, and the power button portion may be turned on.

Then, the first and second valves 46 and 47 of these test benches are respectively opened and closed (step S9 of FIG. 4), so that the ducts 44 are opened.

Upon this operation, the sampling units 11 and 11a take in air in the atmosphere as the diluting air from the atmosphere introducing unit 45.

In this manner, with the structure of supplying the purified air from the air purifier 1 to the sampling units 11 and 11a through the main duct 7, purified diluting air can be appropriately supplied, by effectively using a small number of air purifiers 1 (one in this case), to the sampling units 11 and 11a that are larger in number than the air purifiers 1.

This means that even if a plurality of sampling units 11, 11a, . . . are employed, the number of air purifiers can be a necessary minimum, leading to a rather low cost. Also, spaces necessary for installing the air purifiers 1 can be small, leading to down sizing of the exhaust gas measuring apparatus.

In addition, regarding the structure using the main duct 7, if the blind cover 8 of the main duct 7 is removed and the main duct 7 is extended, as indicated by an alternate long and two dashes line in FIG. 1, the number of test benches can be increased easily.

In measurement of the emission amount of exhaust gases, the net exhaust gas concentration is calculated by subtracting the impurities in the diluting air from the collected exhaust gases. The diluted exhaust gas amount is measured, and the net exhaust gas concentration and the diluted exhaust gas amount are subjected to calculation to obtain the emission amount of exhaust gases. As a consequence, when purified diluting air is used, a highly precise emission amount of exhaust gases can be obtained.

When the blowing flow rates of the sampling units 11, 11a, . . . for the air purifier 1 are controlled by controlling the capacity (rotation speed) of the blower fan 4 that substantially stabilizes the pressure difference ΔP between the atmospheric pressure and the internal pressure of the main duct 7, a necessary diluting air amount in accordance with the number of operating sampling units 11, 11a, . . . can be obtained from the air purifier 1 with a simple control operation.

If the branch ducts 15, 15a, . . . are controlled by the second valves 47, 47a, . . . that are opened and closed when the sampling units 11, 11a, . . . are operative and non-operative, respectively, thereby introducing the diluting air to the operating sampling units 11, 11a, . . . , then the branch ducts 15, 15a, . . . can be reliably opened/closed in accordance with the operative/non-operative states of the sampling units 11, 11a, . . . with a simple structure.

If a structure that introduces air in the atmosphere to the sampling units 11, 11a, . . . by using the ducts 44 and the first valves 46, 46a, . . . is employed, exhaust gas measurement directly using air in the atmosphere as the diluting air, which complies with the conventional exhaust gas regulations, can also be performed.

To collect the diluted exhaust gases, a structure is employed in which the diluting air is drawn with the turbo blower 20, the diluting air is mixed with the exhaust gases from the engine, and a portion of the diluted exhaust gases is collected. Therefore, a predetermined volume of diluted exhaust gas can be collected with a simple structure.

In addition, if the venturi unit 24 capable of adjusting the diluting ratio of the exhaust gases is provided on the upstream side of the turbo blower 20 and the open degree of the second valve 47 is adjusted in accordance with the present diluting ratio when the sampling units 11, 11a, ... are in operation, the emission amount of exhaust gases can be measured for exhaust gases which are diluted with an appropriate diluting ratio.

In the above embodiment, two sampling units 11 and 11a are connected to one air purifier 1. However, the present invention is not limited to this, and more than two sampling units may be connected to one air purifier. Also, even if two air purifiers are employed and sampling units larger in number than the air purifiers, i.e., three or more sampling units, are connected to the two air purifiers through a main duct, the same effect as that of the embodiment described above can be obtained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An exhaust gas measuring apparatus, comprising:
   an atmosphere introducing unit for taking in air in the atmosphere as diluting air;
   an air purifier for taking in and purifying air in the atmosphere, thereby generating diluting air;
   a diluting unit for diluting at least a portion of exhaust gases of an engine with the diluting air;
   selecting means for causing either one of said atmosphere introducing unit and said air purifier to communicate with said diluting unit;
   a sampling unit for collecting diluted exhaust gases; and
   measuring means for obtaining an emission amount of collected gases.

2. An apparatus according to claim 1, wherein said air purifier purifies air by using a catalyst and an adsorbing material.

3. An apparatus according to claim 2, wherein
   said sampling unit includes a first passage portion having one end connected to said selecting means and the other end open to the atmosphere, a suction unit provided in said first passage portion to draw diluting air from said selecting means, a second passage portion having one end connected to an exhaust passage of said engine and the other end connected to said first passage portion, and
   a collecting unit for collecting a gas mixture obtained by mixing said at least the portion of the exhaust gases collected from a downstream side of said second passage portion and the diluting air,
   said first passage portion on an upstream side of said suction unit is provided with a venturi portion for adjusting a diluting ration of the exhaust gases, and
   an amount of the diluting air drawn from said selecting means is adjusted, when said sampling unit is in operation, in accordance with the diluting ration set by said venturi portion.

4. An apparatus according to claim 1, further comprising:
   a first passage; and
   a second passage, wherein a first end of said first passage is connected to said atmosphere introducing unit and a second end of said first passage is connected to said sampling unit, and a first end of said second passage is connected to said air purifier and a second end of said second passage is connected to said sampling unit.

5. An apparatus according to claim 4, wherein
   said sampling unit includes a first passage portion having one end connected to said selecting means and the other end open to the atmosphere, a suction unit provided in said first passage portion to draw diluting air from said selecting means, a second passage portion having one end connected to an exhaust passage of said engine and the other end connected to said first passage portion, and a collecting unit for collecting a gas mixture obtained by mixing said at least the portion of the exhaust gases collected from a downstream side of said second passage portion and the diluting air,
   said first passage portion on an upstream side of said suction unit is provided with a venturi portion for adjusting a diluting ration of the exhaust gases, and
   an amount of the diluting air drawn from said selecting means is adjusted, when said sampling unit is in operation, in accordance with the diluting ration set by said venturi portion.

6. An apparatus according to claim 4, wherein said selecting means includes a first valve provided in said first passage and a second valve provided in said second passage, said selecting means selects diluting air to be introduced to said sampling unit by selectively opening and closing said first and second valves.

7. An apparatus according to claim 6, wherein said sampling unit includes a first passage portion having one end connected to said selecting means and the other end open to the atmosphere, a suction unit provided in said first passage portion to draw diluting air from said selecting means, a second passage portion having one end connected to an exhaust passage of said engine and the other end connected to said first passage portion, and a collecting unit for collecting a gas mixture obtained by mixing said at least the portion of the exhaust gases collected from a downstream side of said second passage portion and the diluting air,
   said first passage portion on an upstream side of said suction unit is provided with a venturi portion for adjusting a diluting ration of the exhaust gases, and
   an open degree of said at least one of said first and second valves are adjusted, when said sampling unit is in operation, in accordance with the diluting ration set by said venturi portion.

8. An apparatus according to claim 1, wherein said sampling unit includes a first passage portion having one end connected to said selecting means and the other end open to the atmosphere, a suction unit provided in said first passage portion to draw diluting air from said selecting means, a second passage portion having one end connected to an exhaust passage of said engine and the other end connected to said first passage portion, and a collecting unit for collecting a gas mixture obtained by mixing said at least the portion of the exhaust gases collected from a downstream side of said second passage portion and the diluting air,
   said first passage portion on an upstream side of said suction unit is provided with a venturi portion for adjusting a diluting ration of the exhaust gases, and an amount of the diluting air drawn from said selecting means is adjusted, when said sampling unit is in operation, in accordance with the diluting ration set by said venturi portion.

9. An apparatus according to claim 8, wherein said amount of diluting air drawn from said selecting means is adjusted by a valve disposed in a passage connecting said other end of said second passage portion and said atmosphere introducing unit.

10. An apparatus according to claim 8, wherein said amount of diluting air drawn from said selecting means is adjusted by a valve disposed in a passage connecting said other end of said second passage portion and said air purifier.

11. An apparatus according to claim 1, further comprising:
at least one additional diluting unit connected to said air purifier; and
at least one additional selecting means for selectively communicating said at least one additional diluting unit with said air purifier.

12. The apparatus according to claim 11, wherein said air purifier has air-supplying means and flow rate controlling means for controlling a flow rate of air supplied from the air-supplying means in accordance with the number of the diluting units connected to said air purifier by said selecting means.

13. The apparatus according to claim 11, wherein said air purifier has air-supplying means and flow rate controlling means for controlling a flow rate of air supplied from the air-supplying means to a prescribed value based on a difference between an atmospheric pressure and a pressure at the downstream side of said air purifier, said pressure depending on the number of the diluting units connected to said air purifier by said selecting means.

* * * * *